United States Patent

Laurila et al.

(10) Patent No.: US 6,856,502 B2
(45) Date of Patent: Feb. 15, 2005

(54) ELECTROLYTIC CAPACITOR AND METHOD FOR COOLING SAME

(75) Inventors: Risto Laurila, Espoo (FI); Mervi Jylhäkallio, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/475,307

(22) PCT Filed: May 7, 2002

(86) PCT No.: PCT/FI02/00385

§ 371 (c)(1),
(2), (4) Date: Oct. 21, 2003

(87) PCT Pub. No.: WO02/093597

PCT Pub. Date: Nov. 21, 2002

(65) Prior Publication Data

US 2004/0130855 A1 Jul. 8, 2004

(30) Foreign Application Priority Data

May 11, 2001 (FI) .............................. 20010999

(51) Int. Cl.[7] ............................... H01G 9/08
(52) U.S. Cl. ............ 361/517; 361/301.5; 361/519; 361/520; 361/523; 361/525; 361/528; 29/25.03
(58) Field of Search ............... 361/517, 519, 361/520, 523, 525, 528, 529, 530, 301.5, 302, 301.3, 535, 536; 29/25.03

(56) References Cited

U.S. PATENT DOCUMENTS

| 5,517,386 A | * | 5/1996 | Te Weng ................. 361/321.6 |
| 5,673,168 A | * | 9/1997 | Efford et al. ............... 361/518 |
| 5,708,558 A | * | 1/1998 | Dequasie ................. 361/301.5 |
| 6,262,360 B1 | | 7/2001 | Michel ...................... 174/16.3 |
| 6,433,997 B1 | * | 8/2002 | Noguchi et al. ............ 361/511 |
| 2002/0141135 A1 | * | 10/2002 | Henderson et al. ...... 361/301.5 |

FOREIGN PATENT DOCUMENTS

| EP | 0 780 855 | 6/1997 |
| GB | 2 063 564 | 6/1981 |
| JP | 10-223474 | 10/1998 |
| JP | 11-102841 | 11/1999 |

* cited by examiner

Primary Examiner—Dean A. Reichard
Assistant Examiner—Nguyen T. Ha
(74) Attorney, Agent, or Firm—Dykema Gossett PLLC

(57) ABSTRACT

The invention relates to a method for cooling an electrolytic capacitor comprising a casing (1) that surrounds a capacitive element (2), and to an electrolytic capacitor. The casing (1) is provided with a hollow (3), and a cooling element (4) made of an electrically insulating material is placed in the hollow (3), the cooling element comprising at least one duct (5), which can be arranged to receive a cooling medium. Since the cooling element placed in the hollow is made of an electrically insulating material, the cooling medium can be liquid, such as water.

10 Claims, 2 Drawing Sheets

ELECTROLYTIC CAPACITOR AND METHOD FOR COOLING SAME

BACKGROUND OF THE INVENTION

The invention relates to a method for cooling an electrolytic capacitor comprising a casing that surrounds a capacitive element.

The invention also relates to an electrolytic capacitor comprising a casing that surrounds a capacitive element.

With the increasing power density of electronic components, cooling has become more demanding. Increased power dissipation and high standards set by the environment of use have forced manufacturers in some cases to start using arrangements based on liquid cooling. One of the components creating problems in liquid cooling is the electrolytic capacitor.

The prior art teaches several alternative arrangements for cooling electrolytic capacitors via the outer casing. One arrangement relates to cooling the capacitor via the bottom plate (ACW6XX Drives Hardware Manual, 3AFY64314149). In such a case the bottom plate must be somehow insulated from the cooling circulation since the casing is in electrical contact with the cathode of the capacitor. This insulation creates problems in both assembly and heat transmission. Such an insulating layer should be easy to amount and in addition to the electrical insulating properties, it should have rather high thermal conductivity, which is very difficult to obtain with the aforementioned prior art arrangement.

Cooling can also be arranged from the inside of the electrolytic capacitors, since there is a pin in the middle of the capacitor, and the anode and cathode foils and the insulating layer are wound around the pin. Furthermore, the central pin also functions as a part of external fastening. This pin can be replaced with a cooling arrangement. Publication JP 1.1329899 discloses a capacitive element, where a metal foil and an insulating material have been coiled around a thermal pipe that also acts as the core or central pin. The end of the thermal pipe situated outside the capacitive element is provided with cooling fins, so that a cooling medium can be made to circulate in the thermal pipe. Thus in this case, the cooling medium is made to vaporize at the end situated inside the capacitive element and the medium is condensed back into a liquid at the other end located outside the capacitive element. Since the thermal pipe is known per se, the operation thereof will not be described in more detail herein. A problem with the arrangement according to the aforementioned JP publication is that it only transfers thermal energy away from the core of the capacitive element, whereas the thermal energy emitted by the thermal pipe should be further conducted out of the system so as not to heat the other components therein.

EP 0,780,855 discloses an electrolytic capacitor comprising a pipe or a cooling duct that travels through the capacitor in the middle of a capacitive element. A cooling medium, such as air, can be made to flow through the pipe. Since the pipe is not insulated at all from the electrolytic capacitor, the cooling medium in this known arrangement cannot be liquid, such as water. Another problem with the arrangement according to the EP publication is that since the pipe travels through the entire electrolytic capacitor, the structure of the capacitor cover must be changed due to the opening to be provided for the pipe in the cover. The pipe and the cover will be joined by a sealing joint, which makes it more difficult to provide electric insulation and causes one more joint in the structure, through which electrolytic liquid can flow out. A conventional electrolytic capacitor comprises a joint between the outer casing and the cover. It is difficult to close tightly two joints on the same plane, and sealing of the two joints requires that the joints must be exactly on the same level after the closing.

BRIEF DESCRIPTION OF THE INVENTION

An objective of the invention is to provide a method for cooling an electrolytic capacitor, and an electrolytic capacitor so as to solve the aforementioned problems.

The objective of the invention is obtained by a method, which is characterized by providing the casing with a hollow, placing a cooling element made of an electrically insulating material in the hollow, the cooling element comprising at least one duct for cooling medium, and conducting a cooling medium into the duct.

The electrolytic capacitor according to the invention is characterized in that the casing is provided with a hollow, a cooling element made of an electrically insulting material is placed in the hollow, the cooling element comprising at least one duct for cooling medium, and a cooling medium can be conducted into the duct.

The preferred embodiments of the invention are disclosed in the dependent claims.

In the arrangement according to the invention, a cooling medium, such as water, circulates via a hollow formed in the casing and extending preferably all the way to the core of the electrolytic capacitor. The hollow is preferably designed to constitute a central pin that is surrounded by a capacitive element. A cooling element made of plastic or some other similar insulating material is placed in the hollow, the cooling element comprising at least one duct for the cooling medium.

Since the casing comprises a hollow, the capacitor cover does not have to be provided with an opening, as in the arrangement according to EP 0,780,855, for example. The resulting structure will thus be simpler and can be sealed more easily.

Since the cooling element placed in the hollow is made of an electrically insulating material, the cooling medium can be liquid, such as water.

An advantage of the arrangement according to the invention is that the cooling medium heated by the capacitive element can be easily transferred to a desired location for cooling. This is advantageous in systems with a large number of components generating thermal energy and/or components that should not be heated by thermal energy generated by other components. Furthermore, it is easy to provide the supply of cooling medium in the capacitive element if the system comprises other components to be cooled by the cooling medium.

BRIEF DESCRIPTION OF THE FIGURES

The invention will be described below in connection with preferred embodiments and with reference to the accompanying drawings, in which.

DETAILED DESCRIPTION OF THE INVENTION

Figure 1:
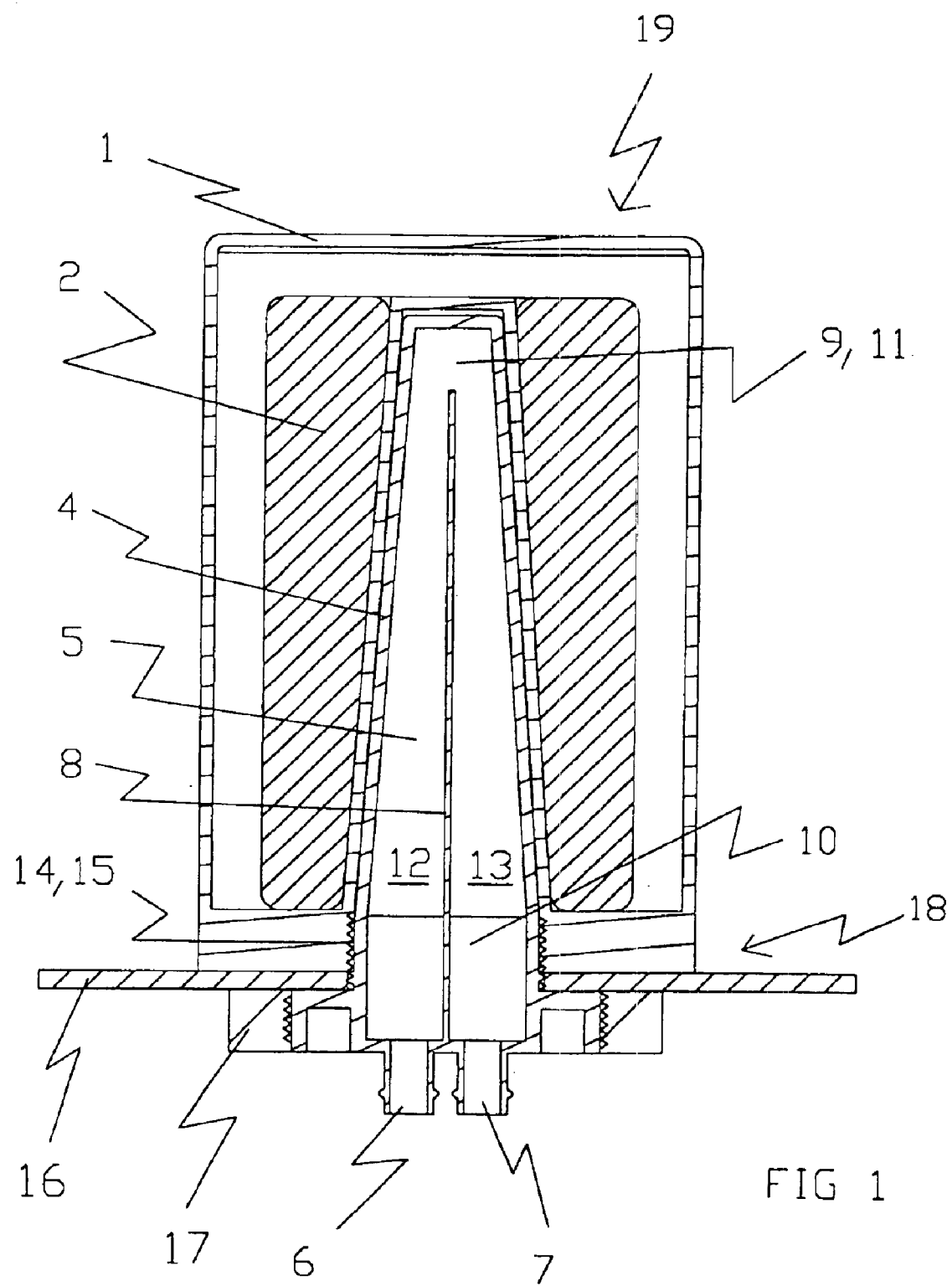
FIG. 1 shows a sectional view of an electrolytic capacitor provided with a cooling arrangement according to the invention.
Figure 2:
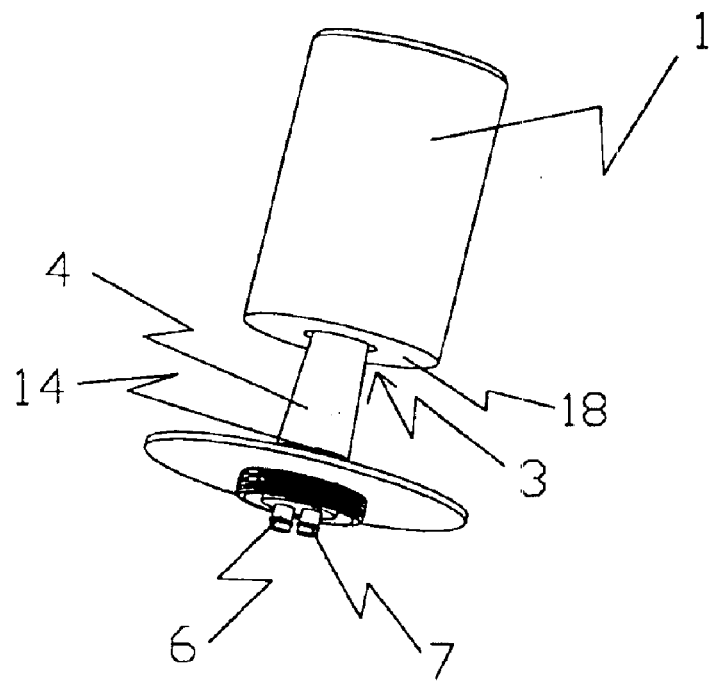
FIG. 2 shows a partly disassembled electrolytic capacitor provided with a cooling arrangement according to the invention.
Figure 3:
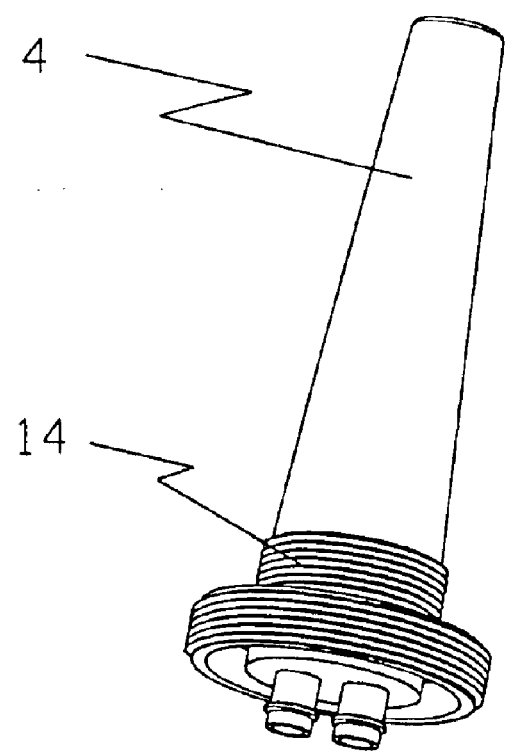
FIG. 3 shows a cooling element.

FIG. 1 shows an electrolytic capacitor comprising a casing 1 enclosing a capacitive element 2.

The casing 1 is provided with a hollow 3 comprising a cooling element 4 made of an electrically insulating material. The cooling element 4 is provided with at least one duct 5 for cooling medium (not shown in the figures), which is preferably a cooling liquid, such as water.

The duct 5 is preferably provided with connectors 6 and 7 for connecting the duct 5 to pipes for cooling medium (not shown in the figures) or to a system for cooling medium (not shown in the figures).

A plurality of electrolytic capacitors comprising a hollow 3 can also be placed on a cooling plate (not shown in the figures) comprising ducts for cooling medium (not shown in the figures), several cooling elements 4 with ducts for cooling medium being provided on the top of the cooling plate.

In the figures, the casing 1 of the electrolytic capacitor is substantially cylindrical, meaning that the cross-sectional shape of the casing is substantially round. The electrolytic capacitor shown in the figures comprises a bottom 18 and a cover 19. The cover 19 is provided with connectors (not shown in the figures) for connecting the electrolytic capacitor. In the electrolytic capacitor according to the figures, the hollow 3 is formed at the bottom 18 of the electrolytic capacitor.

The hollow 3 is preferably designed to be at least partly surrounded by the capacitive element 2. In FIG. 1, the hollow 3 is designed to constitute the central pin of the electrolytic capacitor.

The cooling element 4 is preferably made of plastic or some other electrically insulating material.

In the figure, the dimensions and the shape of the cooling element 4 substantially correspond to those of the hollow 3. Thermal energy is thus efficiently transferred from the electrolytic capacitor to the cooling medium.

In its simplest form the duct 5 is simply a cavity, which receives cooling medium. The duct 5 preferably comprises a beginning and an end. Cooling medium can be supplied to the duct 5 from the beginning and it can be removed therefrom via the end.

The figure shows a cooling element 4 consisting of a conical pipe provided with a partition 8. The pipe comprises a closed end 9 and an open end 10. Near the closed end 9 of the pipe, the partition 8 is provided with an opening 11 for conducting cooling medium through the partition 8. Cooling medium can thus be conducted to the pipe via the open end 10 thereof from the first side 12 of the partition 8, and the cooling medium heated by the electrolytic capacitor can be removed from the pipe via the open end thereof 10 from the second side 13 of the partition 8.

The figures show an electrolytic capacitor where the hollow 3 is substantially conical. The cooling element 4, the dimensions and the shape of which correspond substantially to those of the hollow 3 in the arrangement of FIG. 1, is also substantially conical. Alternatively, the hollow 3 and/or the cooling element 4 can be substantially cylindrical. A cylindrical or conical structure makes the cooling element highly resistant to pressure, wherefore the arrangement according to the invention can also be applied in apparatuses with a high pressure of the cooling medium. An advantage of high pressure is that it presses the cooling element 4 closely against the walls of the hollow 3, thus providing good thermal contact between the cooling element 4 and the walls of the hollow 3.

The cooling element 4 shown in the figures comprises external threads 14 arranged to interact with internal threads 15 provided in the hollow 3. The cooling element 4 can be screwed on the electrolytic capacitor by means of the external threads 14 and the internal threads 15.

FIG. 1 also shows a plate 16, to which the electrolytic capacitor is fastened by means of the cooling element 4. The plate shown in the figure is rather small, and only one electrolytic capacitor is fastened thereto. Alternatively, the plate 16 can be a part of a larger construction, i.e. for example several electrolytic capacitors can be fastened to the same plate. FIG. 1 also shows a nut 17 for fastening the electrolytic capacitor to the plate 16.

The invention also relates to a method for cooling an electrolytic capacitor comprising a casing 1 that surrounds a capacitive element 2 and is provided with a hollow 3. The hollow 3 is provided with a cooling element 4 made of an electrically insulating material and comprising at least one duct 5 arranged to receive a cooling medium.

It is evident for a person skilled in the art that as the technology develops, the basic idea of the invention can be implemented in various manners. The invention and the embodiments thereof are thus not restricted to the examples described above, but they may vary within the scope of the claims.

What is claimed is:

1. A method for cooling an electrolytic capacitor comprising a casing that surrounds a capacitive element,
    in which method the casing is provided with a hollow,
    in which method a cooling element made of an electrically insulating material is placed in the hollow, the cooling element comprising at least one duct for cooling medium, and
    in which method a cooling medium is conducted into the duct.

2. An electrolytic capacitor comprising a casing that surrounds a capacitive element,
    wherein the casing is provided with a hollow, and
    wherein a cooling element made of an electrically insulating material is placed in the hollow, the cooling element comprising at least one duct for conducting a cooling medium through the cooling element.

3. An electrolytic capacitor according to claim 2, wherein the hollow is designed to be at least partly surrounded by the capacitive element.

4. An electrolytic capacitor according to claim 2, wherein the hollow is designed to operate as a central pin of the electrolytic capacitor.

5. An electrolytic capacitor according to claim 2, wherein the cooling element is made of plastic or some other electrically insulating material.

6. An electrolytic capacitor according to claim 2, wherein the dimensions and the shape of the cooling element correspond substantially to those of the hollow.

7. An electrolytic capacitor according to claim 2,
wherein the duct comprises a beginning and an end, and
wherein a cooling medium can be conducted to the duct from the beginning and removed therefrom via the end.

8. An electrolytic capacitor according to claim 2,
wherein the cooling element consists of a pipe provided with a partition and a closed end and an open end,
wherein the partition is provided with an opening near the closed end of the pipe for conducting cooling medium through the partition, and
wherein the cooling medium can be conducted to the pipe via the open end thereof from a first side of the partition and removed from the pipe via the open end thereof from a second side of the partition.

9. An electrolytic capacitor according to claim 2, wherein the cooling element is at least substantially conical.

10. An electrolytic capacitor according to claim 2, wherein the cooling element comprises external threads, the hollow comprises internal threads, and the cooling element can be screwed on the electrolytic capacitor by means of the external threads and the internal threads.

* * * * *